(No Model.)
J. J. HICKS & H. PINCHETTI.
CLINICAL THERMOMETER.
No. 460,013. Patented Sept. 22, 1891.
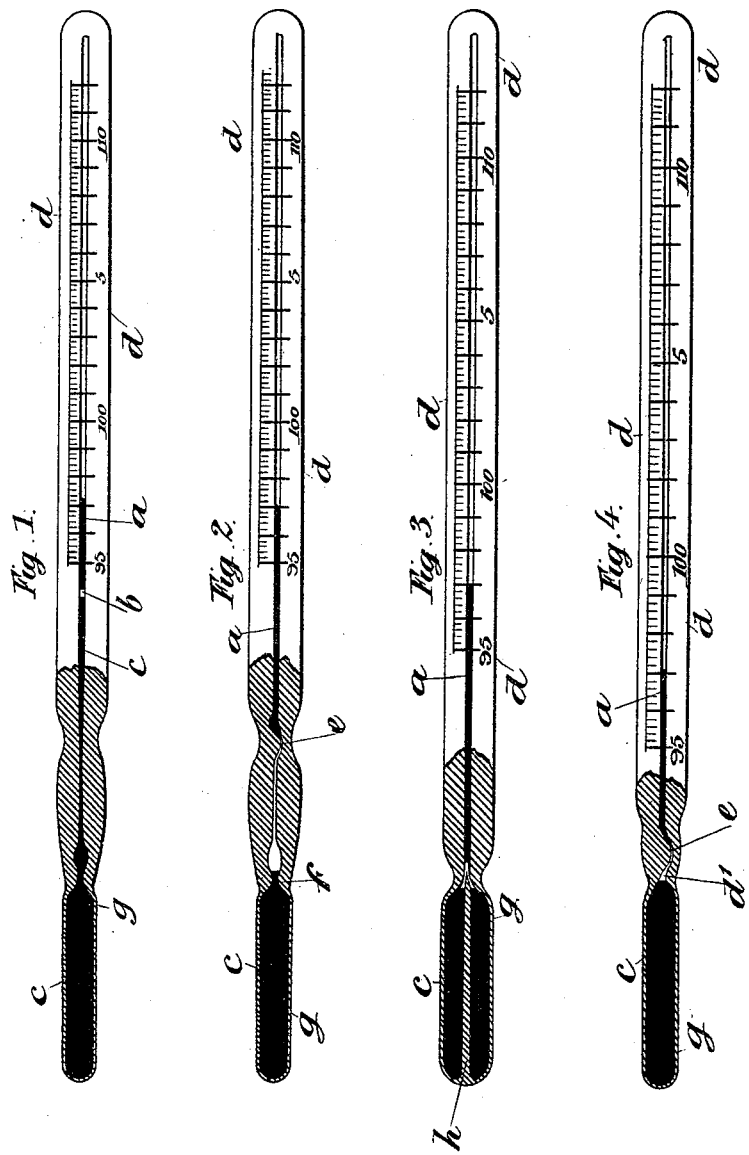

UNITED STATES PATENT OFFICE.

JAMES J. HICKS, OF LONDON, ENGLAND, AND HENRY PINCHETTI, OF LUGANO, SWITZERLAND; SAID PINCHETTI ASSIGNOR TO SAID HICKS.

CLINICAL THERMOMETER.

SPECIFICATION forming part of Letters Patent No. 460,013, dated September 22, 1891.

Application filed May 2, 1891. Serial No. 391,422. (No model.)

*To all whom it may concern:*

Be it known that we, JAMES JOSEPH HICKS, a subject of the Queen of Great Britain, residing at No. 8 Hatton Garden, in the county of Middlesex, England, and HENRY PINCHETTI, a subject of the King of Italy, residing at Lugano, Canton of Ticino, in the Republic of Switzerland, have invented certain new and useful Improvements in Clinical Thermometers and in the Manufacture Thereof; and we do hereby declare that the following is a full, clear, and exact description of the invention, which will enable others skilled in the art to which it appertains to make and use the same.

The invention has for its object improvements in clinical thermometers whereby we obtain a more open scale for a thermometer of given length, together with greater strength and greater quickness of action than are obtained in clinical thermometers as heretofore generally constructed.

The invention also relates to improvements in the method of manufacturing such improved thermometer whereby less risk of breakage and failure in the manufacture thereof is incurred, while the mercury is retained in a cleaner condition, the bore is freer from moisture, and the vacuum is more complete than if the ordinary method of manufacture were adopted throughout.

In the accompanying drawings, which are made to an enlarged scale, Figure 1 is a longitudinal section of a clinical thermometer provided with what is known as "Professor Phillips's plan of registering maximum temperatures." Fig. 2 is a side view, partly in section, of a clinical thermometer provided with what is known as an "indestructible" index. Fig. 3 is a side view, partly in section, of a clinical thermometer having the entrance from the bulb into the bore contracted or throttled by a glass needle or "splint" fixed in the center of the bulb; and Fig. 4 is a side view, partly in section, of a clinical thermometer constructed according to our invention.

Clinical thermometers as heretofore constructed have, according to Professor Phillips's plan, (represented at Fig. 1,) been provided with an index consisting of a short length of mercury $a$, separated by a small air-speck $b$ from the main column $c$, and which index $a$ in the rise of the main column $c$ is forced forward at the minimum distance from the latter, but which index on the descent of such main column is left behind at the maximum point reached. Clinical thermometers of the character represented at Fig. 2 have also heretofore had the passage through the tube $d$ contracted to what is known in the trade as a "knife-edge" contraction at a point $e$ distant from about half an inch to an inch (more or less) from the neck $f$ of the bulb $g$, by which means, after the column of mercury has risen to its maximum height, and that in the bulb and below the contraction $e$ begins to cool, the column in the tube $d$ above the contraction $e$ is cut off from the main body of mercury and remains in its maximum position, thereby forming what is known as an "indestructible" index, the mercury below the contraction $e$ contracting away therefrom. Then in order to reset the thermometer for fresh use it has to be swung until the greater part of the mercury in the tube $d$ above the contraction $e$ has descended below the latter and the top of the column is below the lowest division of the scale. In this class of thermometer, the tube being divided only above the contraction, the scale is consequently not so open as if the entire tube above the neck of the bulb were available for the scale. There is also a considerable delay in the indication of the temperature by such class of thermometer, as in forming such knife-edge contraction a chamber is first formed in the tube at the point required by sealing the latter, and then by means of a blow-pipe heating it at the required part, when the air contained therein will become expanded by the heat and will blow out the heated part of the tube and thereby form a chamber therein. Then after exhausting the tube and again heating the part surrounding the said chamber the latter collapses, so as to almost close the tube, and thereby form the knife-edge division. The said chamber, however, is still left of such capacity as in some cases to contain sufficient mercury to fill the upper part of the tube, or nearly so. This chamber is also surrounded by comparatively thick glass, and when the thermometer is in use the said chamber is generally placed outside of the mouth or other part to which the thermometer is applied. It therefore takes a somewhat considerable time before the thermometer correctly indicates the temperature; and, again, such a thermometer is very liable to fracture at the knife-edge contraction during the process of preparing the scale and after completion when swinging it for the purpose of driving the mercury below the lowest division of the scale.

In the form of thermometer shown at Fig. 3 a glass needle or splint $h$ has heretofore been fixed in the center of the bulb $g$ and has had its upper end arranged in such relation to the bore of the tube $d$ as to partially throttle the entrance from the bulb $g$, whereby, although the mercury is capable of passing the same when rising, it is prevented from returning to the bulb $g$ when the mercury is cooling. This form of thermometer, although affording a recording-index, has not come largely into use. As the bulb $g$ is unduly enlarged, there is great difficulty in perfectly withdrawing all the air therefrom, which makes it almost worthless, and it has other drawbacks which render it objectionable. Now according to our invention, as represented at Fig. 4, we avoid these disadvantages and obtain the advantages hereinbefore named by placing the knife-edge contraction $e$ in close proximity with the bulb $g$, whereby we are enabled to use that portion of the tube $d$ heretofore existing between the bulb $g$ and the knife-edge contraction $e$, and thereby avail ourselves of the entire length of the tube $d$ for forming thereon the scale.

In constructing a thermometer according to our invention we first, by the aid of the blow-pipe, open out the end of the tube $d$ to be joined with the bulb, and thereby form a small chamber $d'$, as usual. We then blow thereon a portion of "bulb-cylinder," and after having blown and formed the bulb to desired shape and size we dip the tube in mercury and about half fill the bulb therewith, all the above processes being those usually adopted in the making of other clinical thermometers. We then, according to our invention, seal the lower end of the bulb $g$ and open the top end of the tube $d$, after which we "boil" the mercury in the bulb $g$, so as to force out the air from the tube $d$. Then when the mercury is seen to escape from the top end of the latter, instead of placing it in a cup of mercury to fill, as usual, we seal such top end with wax. We then, after the mercury has cooled and returned to the bulb $g$, heat by a blow-pipe the chamber $d'$, adjoining the bulb, so as partially to contract it. The reason for only partially forming the contraction at this stage is that supposing the contraction were fully formed at this time then in the second boiling of the tube, which is necessary to fill the bulb, there would be great risk of the bulb bursting while, on the other hand, on placing the thermometer in mercury after the said boiling the mercury would be unable to enter the bulb on account of the resistance caused by the contraction. The top end of the tube $d$ is then unsealed and the mercury "boiled" in the usual way, after which we place the tube in a vessel containing mercury, where it is left until it becomes filled therewith. We then, as usual, warm the partially-formed thermometer, so as to be enabled to mark the length of tube $d$ required for the scale and to see that the same is of the desired length. The tube $d$ is then cooled and the top end closed with wax, after which we heat the top end of the tube $d$ above the part required for the top end of the thermometer when finished and there form a chamber. It is then unsealed, and the top of the tube $d$ beyond the said chamber is by the aid of the blow-pipe drawn out to a fine tube or splint, and then by warming the thermometer we expand the mercury until it begins to pass through such fine tube, thereby driving the air out of the tube, after which we seal the tube $d$ just above the last-mentioned chamber and at the same time melt off the fine tube or splint. Part of the mercury in the bulb $g$ is then shaken into the chamber at the top of the tube $d$, after which, by the aid of a blow-pipe, we complete the contraction $e$ in the chamber $d'$ adjoining the bulb $g$. The whole of the mercury is then shaken into the bulb $g$ and the chamber at the top end of the tube is used in the ordinary manner as a means of regulating the mercury in the thermometer-tube according to the scale, and when this is effected the tube is sealed below the said chamber and the latter melted off in the usual manner. The thermometer is then divided and has the scale applied in the ordinary manner.

A thermometer constructed as herein described has all its mercury contained in the bulb $g$ and in the chamber $d'$, adjoining such bulb. In use, therefore, all that part of the thermometer containing the mercury is inserted in the mouth or other part of which the temperature is required, and thereby the thermometer is much quicker in its action than is the case with thermometers having a contracted chamber at a distance from the bulb.

Having fully described our invention, what we desire to claim and secure by Letters Patent is—

1. A clinical thermometer having the knife-edge contraction for producing the indestructible index in close proximity with the bulb, substantially as herein shown and described, and for the purpose stated.

2. A clinical thermometer having the knife-edge contraction for producing the indestructible index in close proximity with the bulb, and the scale extending over a greater length of the tube than heretofore, substantially as herein shown and described, and for the purpose stated.

3. The manufacture of the improved clinical thermometer of the character herein described by the following process: first, forming a small chamber at one end of the length of tube; second, blowing the bulb onto such chamber; third, half filling the bulb with mercury, as usual; fourth, sealing the lower end of the bulb; fifth, opening the top end of the tube; sixth, boiling the mercury in the bulb to force out the air from the tube; seventh, sealing the top end of the tube with wax; eighth, partially forming the contraction for the indestructible index in close proximity with the bulb by heating the small chamber adjoining the bulb; ninth, unsealing the top end of the tube; tenth, boiling the mercury in the usual way; eleventh, placing the tube in a vessel containing mercury to fill; twelfth, warming the partially-formed thermometer and marking length of tube required for the scale, as usual; thirteenth, cooling tube and closing top end thereof with wax; fourteenth, forming a chamber at top end of tube above the part required for the finished thermometer; fifteenth, unsealing the top end of tube and drawing it out to a fine tube or splint; sixteenth, warming thermometer to drive out air therefrom; seventeenth, sealing tube above chamber at top end thereof and at same time melting off the fine tube or splint; eighteenth, shaking part of mercury in bulb into chamber at top end of tube; nineteenth, completing by a blowpipe the contraction in the chamber adjoining the bulb; twentieth, shaking all the mercury into the bulb; twenty-first, regulating the mercury in the thermometer-tube according to the scale; twenty-second, sealing the tube below the chamber at top end and melting off said chamber in the usual manner, and, twenty-third, dividing the tube and applying the scale in the ordinary way, substantially as herein described.

JAS. J. HICKS.
HENRY PINCHETTI.

Witnesses as to signature of Jas. J. Hicks:
CLAUDE K. MILLS,
23 *Southampton Bldgs., Patent Agent, London, W. C.*
C. W. RICHMOND.

Witnesses as to signature of Henry Pinchetti.
DEMETRIC BUSSINGER,
PORETTI TANIREDI,
*Both of Lugano, Canton Ticino.*